(12) United States Patent
Sasidharan et al.

(10) Patent No.: US 8,837,507 B2
(45) Date of Patent: Sep. 16, 2014

(54) COMMUNICATIONS METHOD

(75) Inventors: Suresh Kumar Kesavan Sasidharan, Kerala (IN); Sarvesh Kumar Varshnay, Mumbai (IN); Vivek Agarwal, Mumbai (IN)

(73) Assignee: Oracle International Corporation, Redwood Shores, CA (US)

( * ) Notice: Subject to any disclaimer, the term of this patent is extended or adjusted under 35 U.S.C. 154(b) by 656 days.

(21) Appl. No.: 11/580,879

(22) Filed: Oct. 16, 2006

(65) Prior Publication Data
US 2007/0136478 A1 Jun. 14, 2007

(30) Foreign Application Priority Data

Dec. 9, 2005 (GB) .................................. 0525121.0

(51) Int. Cl.
| | |
|---|---|
| H04L 12/54 | (2013.01) |
| H04M 3/42 | (2006.01) |
| H04W 74/00 | (2009.01) |
| H04W 4/00 | (2009.01) |
| G06F 15/16 | (2006.01) |
| G06F 15/173 | (2006.01) |
| H04L 29/02 | (2006.01) |
| H04L 29/04 | (2006.01) |
| H04L 29/06 | (2006.01) |

(52) U.S. Cl.
CPC ............... *H04L 29/02* (2013.01); *H04L 29/04* (2013.01); *H04L 29/06068* (2013.01)
USPC ........... 370/429; 709/227; 709/228; 709/238; 709/239; 455/414; 455/445; 455/461

(58) Field of Classification Search
CPC .... H04L 29/02; H04L 29/04; H04L 29/06068
USPC ................. 370/429; 709/238, 239, 227, 228; 455/414, 445, 461
See application file for complete search history.

(56) References Cited

U.S. PATENT DOCUMENTS

| | | | | |
|---|---|---|---|---|
| 3,989,116 | A * | 11/1976 | Hirano | 180/19.3 |
| 4,861,218 | A * | 8/1989 | Lamer | 414/461 |
| 5,123,827 | A * | 6/1992 | Lupke | 425/133.1 |
| 5,764,793 | A * | 6/1998 | Omae et al. | 382/149 |
| 6,430,604 | B1 * | 8/2002 | Ogle et al. | 709/207 |
| 6,968,367 | B1 * | 11/2005 | Vassar et al. | 709/219 |
| 2002/0160757 | A1 * | 10/2002 | Shavit et al. | 455/414 |

(Continued)

OTHER PUBLICATIONS http://www.siebel.com/call-center/support-for-multiple-c.shtm
Multichannel Contact Center Support.

(Continued)

*Primary Examiner* — Hassan Phillips
*Assistant Examiner* — Lonnie Sweet
(74) *Attorney, Agent, or Firm* — Hickman Palermo Truong Becker Bingham Wong LLP

(57) ABSTRACT

A computer-implemented method for establishing a communications link between a source and a target comprises:
a) receiving, at a server, data identifying the source and the target;
b) for each of the source and the target, retrieving a respective communication profile identifying one or more communications systems by which the respective one of the source or target may be communicated with;
c) comparing the profiles to identify one or more common communications systems; and
d) opening a communications link between the source and the target using one or more of the common communication systems.

19 Claims, 8 Drawing Sheets

(56) References Cited

U.S. PATENT DOCUMENTS

Figure 1:
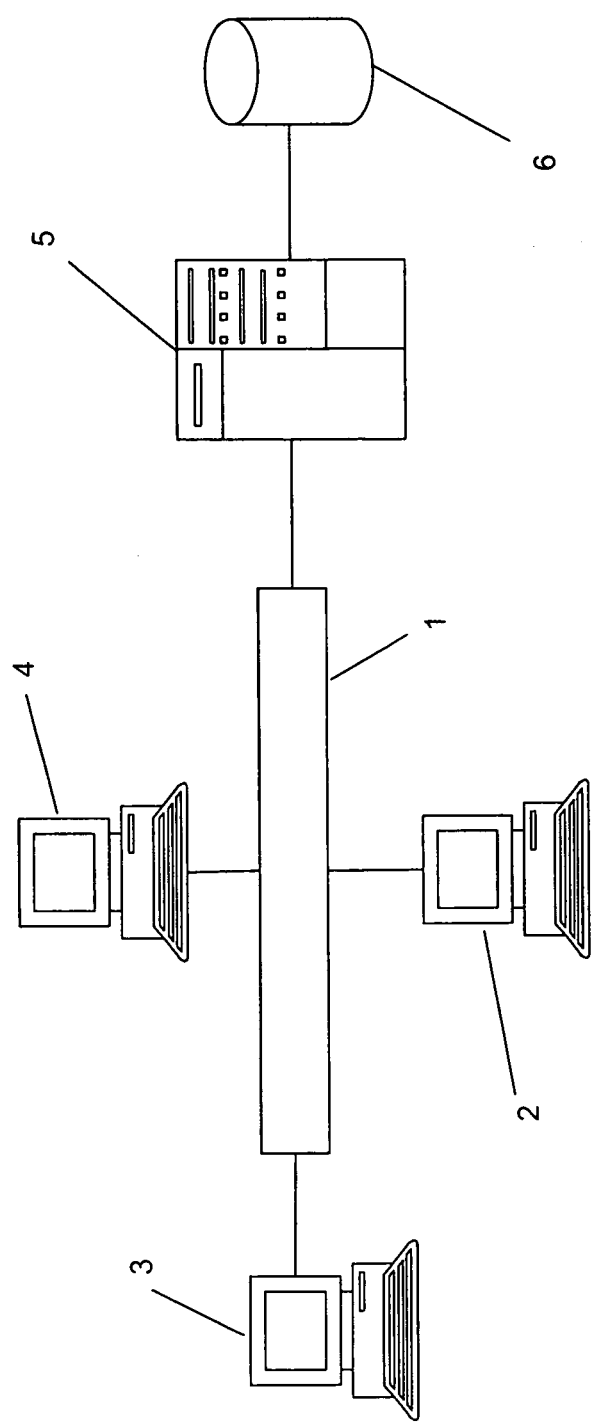

| | | | |
|---|---|---|---|
| 2002/0161862 A1* | 10/2002 | Horvitz | 709/220 |
| 2003/0236846 A1* | 12/2003 | Fukushima | 709/206 |
| 2004/0008373 A1* | 1/2004 | Yamamoto | 358/1.15 |
| 2004/0042414 A1* | 3/2004 | Bouret et al. | 370/252 |
| 2005/0039012 A1* | 2/2005 | Ishibashi et al. | 713/170 |
| 2005/0086305 A1* | 4/2005 | Koch et al. | 709/206 |
| 2005/0091327 A1* | 4/2005 | Koch | 709/206 |
| 2005/0193102 A1* | 9/2005 | Horvitz | 709/220 |
| 2005/0209950 A1* | 9/2005 | Clark | 705/37 |
| 2006/0067250 A1* | 3/2006 | Boyer et al. | 370/260 |
| 2006/0067252 A1* | 3/2006 | John et al. | 370/261 |
| 2007/0112032 A1* | 5/2007 | Whitcup et al. | 514/337 |

OTHER PUBLICATIONS

Avaya Intelligent Email Management, White Paper May 2003, pp. 1-16.

http://www.novomind.com/index_ht_en.html?/products/prod_Email_en.html NOVOMIND iMail™—INTELLIGENT eMail Response Management via Natural Language Processing.

http://www.hep.anl.gov/gtb/trove/qspires.txt.

http://www.terena.nl/library/gnrt/group/listserv.html.

\* cited by examiner

| User | Communication Channels | Priority | Inhibit |
|---|---|---|---|
| Agent | Landline telephone<br>Mobile telephone<br>Instant messaging | 1<br>2<br>3 | User 3 |
| Customer | Landline telephone<br>Mobile telephone<br>Instant messaging | 1<br>2<br>3 | Agent |
| User 3 | Landline telephone | 1 | |
| User 4 | Instant messaging<br>Landline telephone | 1<br>2 | |

Figure 7

COMMUNICATIONS METHOD

This invention relates to a computer-implemented method for establishing a communications link between a source and a target, and to a server adapted to perform the method.

Electronic mail (e-mail) is extremely prolific. It represents one of the principal forms of communication between individuals both in commercial and personal arenas.

E-mail is a passive mode of communication in which the clients and servers of an e-mail system do not perform any processing on the content of the e-mail message, but simply make it available for opening and reading by the addressee. As such, all e-mail communication requires the addressee to open the e-mail, read it and, if necessary, act upon the message accordingly. Thus, the addressee will not be aware of the existence of an e-mail, and hence cannot act on it, if they do not have access to e-mail when it is received. In some cases, an e-mail message may remain unopened and ignored for a long length of time, for example because the addressee is on holiday.

In accordance with one aspect of the present invention, there is provided a computer-implemented method for establishing a communications link between a source and a target, the method comprising:
a) receiving, at a server, data identifying the source and the target;
b) for each of the source and the target, retrieving a respective communication profile identifying one or more communications systems by which the respective one of the source or target may be communicated with;
c) comparing the profiles to identify one or more common communications systems; and
d) opening a communications link between the source and the target using one or more of the common communication systems.

In accordance with a second aspect of the present invention, a server is adapted to receive data identifying a source and target, wherein the server comprises a processor adapted to:
a) retrieve, for each of the source and the target, a respective communication profile identifying one or more communications systems by which the respective one of the source or target may be communicated with;
b) compare the profiles to identify one or more common communications systems; and
c) open a communications link between the source and the target using one or more of the common communication systems.

Hence, the invention provides a method and server by which communications may be established between a source and a target in the event that the target cannot be reached by e-mail. For example, a telephone call may be initiated between the source and target. This overcomes the disadvantages with the prior art in that it is now possible to increase the accessibility of individuals by enabling various communications channels to be opened, for example simply by sending an e-mail.

Normally, each communications system is an electronic communications system.

In a preferred embodiment, the data identifying the source and target are embedded in an electronic mail received by the server.

The communications profiles may identify one or more of the following communications systems: electronic mail, instant messaging and telephony.

Preferably, the communication profiles are stored as a data structure on a database.

The communication profiles may include data indicating the priority of a communication system with respect to other communication systems.

The communication profiles may include data indicating whether use of each communication system is inhibited in order to establish a communications link with a particular source or target.

In accordance with a third aspect of the invention, a computer program comprising computer program code means is adapted to perform the steps of the first aspect of the invention when said program is run on a computer.

In accordance with a fourth aspect of the invention, a computer program product comprising program code means stored on a computer readable medium performs the method of the first aspect of the invention when said program product is run on a computer.

Figure 2:
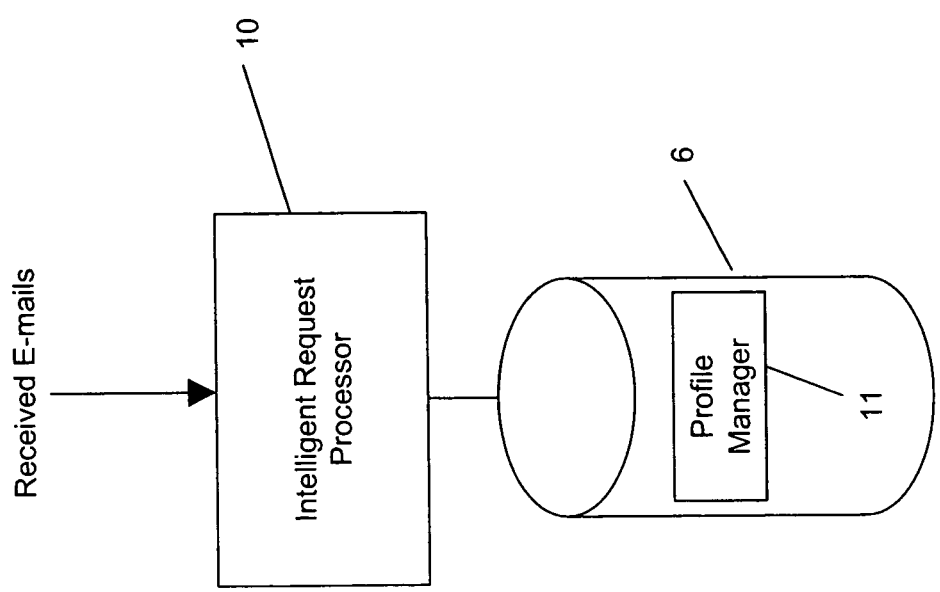
Figure 3:
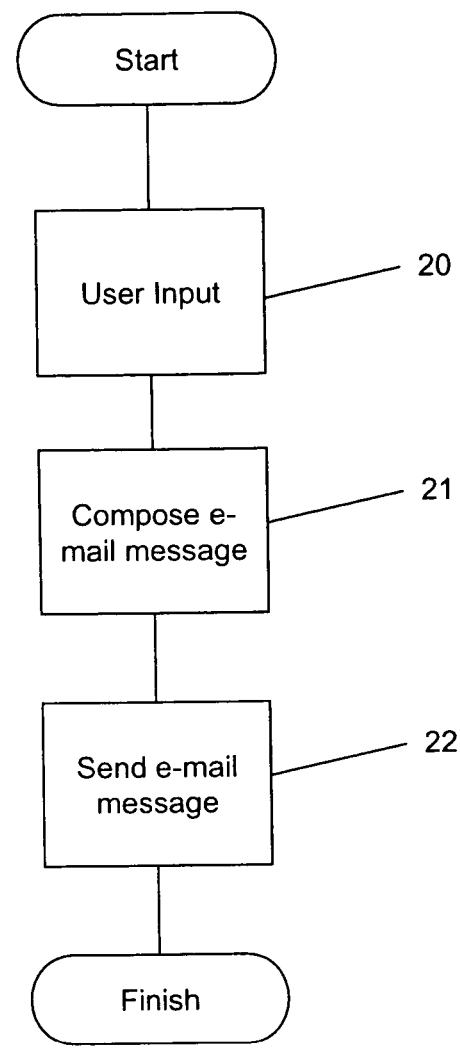
Figure 4:
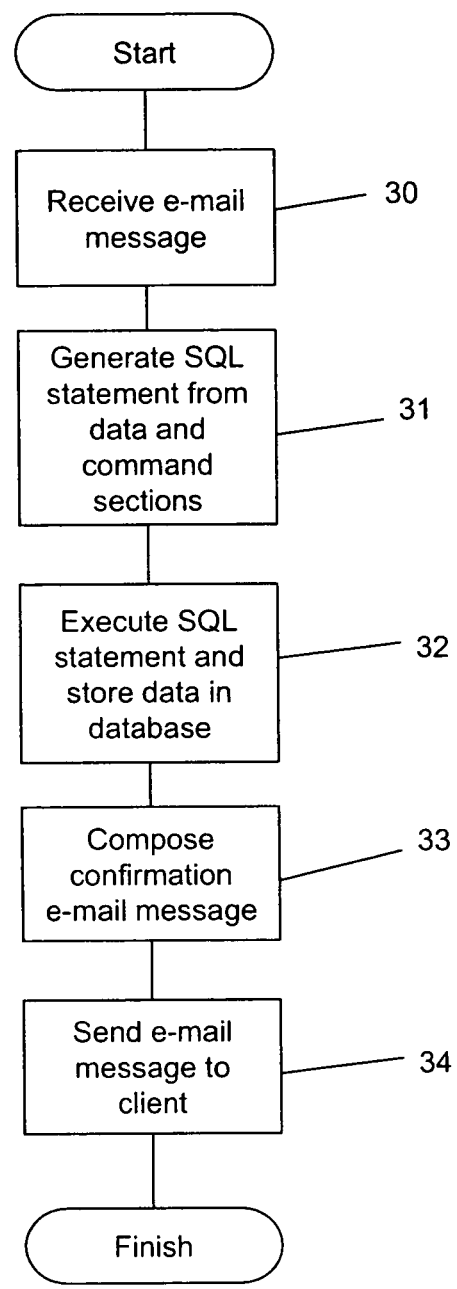
Figure 5:
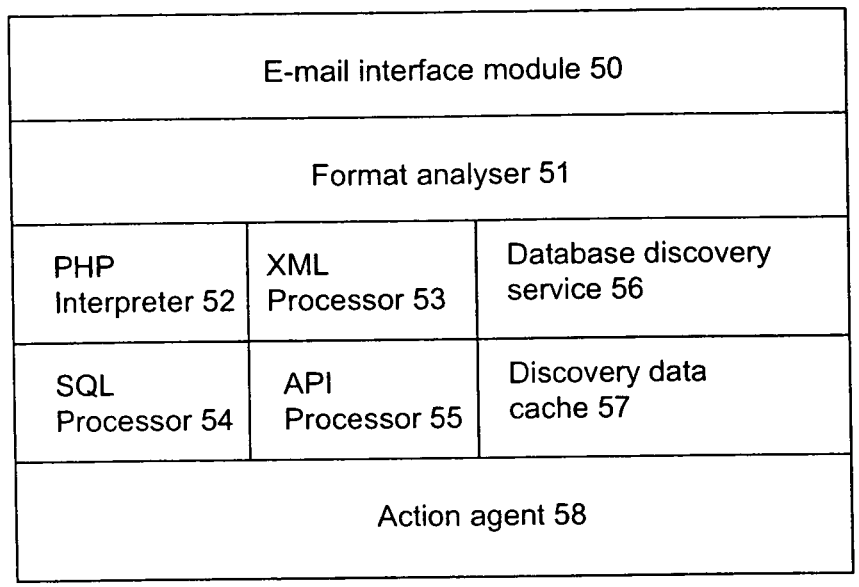
Figure 6:
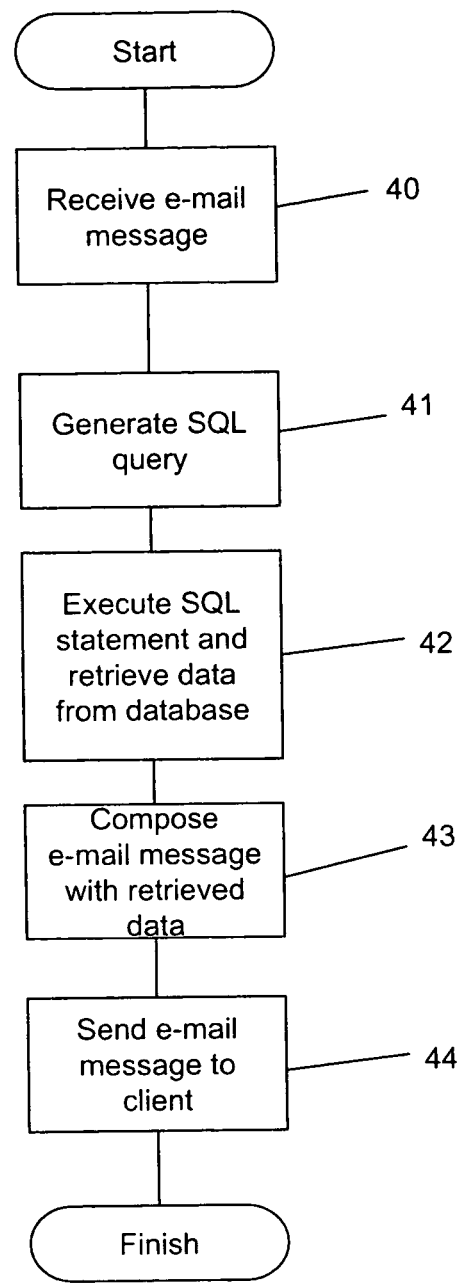
Figure 8:
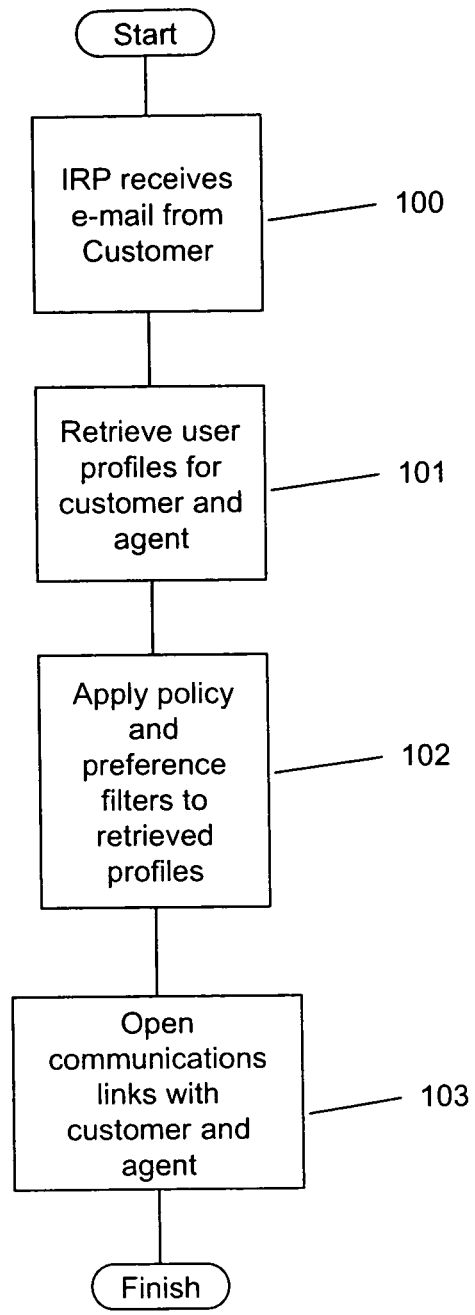

An embodiment of the invention will now be described with reference to the accompanying drawings, in which:
FIG. 1 shows a system for performing the invention;
FIG. 2 shows part of a server forming part of the system of FIG. 1;
FIG. 3 shows a flow chart of a method that is performed by a client of the system of FIG. 1;
FIG. 4 shows a flow chart of a method that is performed by the server of the system of FIG. 1;
FIG. 5 shows the structure of the intelligent request processor;
FIG. 6 shows a flow chart of a method that is performed by the server of the system of FIG. 1;
FIG. 7 shows a sample profile manager; and
FIG. 8 shows a flow chart for the method performed by the invention.

FIG. 1 shows a network 1, to which are connected client computers 2,3 and 4, and a server 5. The server 5 is connected to a database 6 from which it can retrieve data and on which it can store data. The network 1 may be a private local area network (LAN) or wide area network (WAN), or alternatively it may be a public network such as the Internet. In this case, the client computers 2,3 and 4 and the server 5 may communicate with each other by means of a virtual private network (VPN). The database 6 may store, amongst other things, contact details of customers of an organisation.

FIG. 2 shows in more detail part of the server 5. Running on the server 5, there is an intelligent request processor (IRP) 10, which is a software module capable of receiving e-mail communications from the network 1. It is operable, as explained below, to respond to certain types of e-mail communication by storing, updating or retrieving a user's profile, which includes their contact details. The profiles of each user are held in a profile manager 11 which is a table in the database 6. The users may be for example the employees and the customers of a company. In another embodiment, the profile manager may simply be a file stored on a hard disk which can store the profiles.

The operation of the system shown in FIGS. 1 and 2 is best explained by way of example with reference to the flow charts of FIGS. 3 and 4. In this example, a salesman visits a potential customer, and after the visit enters the customer's details into the client computer 2 at which he is working. These details are captured as user input in step 20 and may include the following items: a unique identification number for the customer (customer's ID), a unique identification number for the salesman (salesman's ID), one or more unique identification numbers for other agents of the salesman's organisation who may be associated with this customer (agent's ID(s)), and one or more communication channels via which the customer may be contacted (e.g. land and mobile phone numbers and/or one or more e-mail addresses).

An e-mail message is then automatically composed in step 21. The message comprises a header, a command section, a data section and a footer section. The header indicates the type of message, for example whether it is extensible mark-up language (XML) based, PHP: Hypertext Preprocessor (PHP) based or Python based. The command section indicates the action to be performed by the IRP 10, in this case to add the customer's details (i.e. the user input of step 20), which form the data section of the message. Finally, the footer indicates a second action to be performed on completion of the action indicated in the command section. For example, in this case it may indicate that a confirmation message should be sent to the originator of this e-mail message indicating that the customer's details have been stored on the database.

This e-mail message is sent in step 22 to the server 5. The e-mail message has an address that will cause it to be directed to the server, which is adapted to receive the e-mail. For example, the e-mail may have an address of "irp@domain.com", and the server may be adapted to receive all e-mail messages with an address that resolves to the "domain.com" domain. As shown in FIG. 4, the e-mail message is received from the client by the server in step 30. The server redirects all e-mail messages, such as this one, with the address "irp@domain.com" to the IRP 10.

The detailed structure of the IRP 10 is shown in FIG. 5. The IRP 10 comprises an e-mail interface module 50, a format analyser 51, a PHP interpreter 52, an XML processor 53, a Structured Query Language (SQL) processor 54, an application programming interface (API) processor 55, a database discovery service 56, a discovery data cache 57 and an action agent 58.

The IRP 10 receives the redirected e-mail message via the e-mail interface module 50. This passes the message to the format analyser 51 which confirms that the message has the correct format: that is that it has a header, command and data sections and a footer. The format analyser 51 will examine the header to determine whether the e-mail is PHP or XML based and then pass the message to the PHP interpreter 52 or XML processor 53 respectively.

In step 31 of FIG. 4, the PHP interpreter 52 or XML processor 53 in conjunction with the SQL processor 54 or API processor 55 as appropriate then generates an SQL statement or an API request as appropriate and passes the resulting SQL statement or API request to the action agent 58 respectively. For example, if the e-mail is PHP based and the source data required to execute the required command are stored on the database 6 then the PHP interpreter 52 and SQL processor 54 will generate a SQL query from the command and data sections of the message. Alternatively, if the e-mail is XML based and the source data required to execute the required command are not on the database then the XML processor 53 and API processor 55 will generate a suitable API request from the command and data sections of the message. In either case, the action agent 58 will execute the SQL query or API request in step 32.

In this case, the action agent 58 proceeds by executing an SQL statement on database 6 to create the new customer record including the details sent in the e-mail message in step 22. The action agent 58 may be configured to access a variety of data sources through various mechanisms. For example, it may access an Oracle database using the Oracle Call Interface. Alternatively, it may access a remote database via a network connection. In step 33, the action agent 58 composes a simple e-mail, in accordance with the e-mail's footer, to confirm that the new customer record has been created, and this is sent to the salesman's client computer 2 via the e-mail interface module in step 34.

The API processor 55 is capable of executing batch jobs on the server when an e-mail is received with a suitable set of commands. The IRP 10 can extract these commands from the e-mail and run them on the server. Also, the API processor 55 may be used, for example, to respond to a command by retrieving a specified file from the server and e-mailing it to a specified e-mail address.

For example, a possible format for the e-mail is as shown below:

Header
  Type: XML/PHP
  Subject: (description of email provided by user)
  Profile Credentials: (e.g. username and password)
Command
  Query: e.g. for retrieving data
  Query Type: e.g. retrieve
  Description of command: e.g. retrieve data and send reply by e-mail (may be useful if there is a need for human intervention)
Data
  Credentials: e.g. domain-address, username, password
Footer
  Action: e.g. Reply
  Communication channels: e.g. e-mail address The communication channel specified in the e-mail footer takes precedence over that specified for a user in the user's profile accessible by the IRP 10. It may be used to specify that the response should be sent to someone other than the originating user.

The above e-mail format can be in the XML or PHP format. From the Type field of the e-mail header, the format analyser 51 can identify whether the e-mail is based on XML or PHP. If it is based on XML, the format analyser will redirect the e-mail to the XML processor 53 whilst if it is based on PHP, the format analyser will redirect the e-mail to the PHP interpreter 52. The XML processor 53 or PHP interpreter 52, as the case may be, parses the e-mail based on commonly accepted XML parsing techniques or in a line-by-line fashion in the case of PHP.

The embedded query or command is extracted from the e-mail as a result of this parsing process and passed to the SQL processor 54 or API processor 55 as appropriate which frames the SQL query or API request and passes it to the action agent 58.

The action agent 58 uses data from a discovery data cache 57 for establishing connections with the database 6. A database discovery service 56 discover the different database installations and tables/schema descriptions of the table which will be used by the action agent 58 for executing SQL statements.

If an alternative e-mail address for the response to be sent to is not specified in the e-mail then an e-mail address for the originating user is retrieved from the profile manager 11.

The data retrieved from the database (or as a result of executing the API request) are embedded in a return e-mail which is sent to the e-mail interface module 50 for transmission to the specified e-mail address or that retrieved from the profile manager 11.

FIG. 6 shows the scenario where an agent of the salesman's organisation wishes to contact the customer. The agent may be situated at client computer 3, and proceeds in the same manner as set out in FIG. 3 although in this instance, the user input will for example be the customer's ID and the command section of the e-mail message of step 21 will indicate that it is required to extract the customer's details relating to this ID. After receiving this e-mail message in step 40, the IRP 10 will use the PHP interpreter 52 or XML processor 53 as appropriate in conjunction with the SQL processor 54 in step 31 to generate an SQL command, which is executed by the action agent 58 in step 42.

In step 43, an e-mail would be composed by the action agent 58 that comprises the relevant retrieved details and this e-mail would be sent to the client computer 3 via the e-mail interface 50 in step 44. Since the details indicate which communication channels the customer can be reached via, the agent may now contact the client.

It will be apparent that using the same mechanism, the customer may send an e-mail with an embedded command to the IRP 10 to update his contact details amongst other things.

Furthermore, it should be clear that these enhancements to e-mail have a multiplicity of uses not limited to this particular embodiment. For example, a customer of a bank may wish to obtain his account balance, and he may do this simply by sending an e-mail with an appropriate command section and data section to the bank's server. The bank's server will then respond by interpreting the command and data sections, retrieving the account balance and including this in a return e-mail to the customer.

In addition, the IRP 10 is provided with functionality that can establish a communications link between a source and a target, for example the agent and the customer. For example, the IRP 10 may be able to set up a telephone call using a voice over IP link between the customer and the agent using the agent's telephone number (extracted from the e-mail message) and the customer's telephone number extracted from the profile manager 11.

This scenario will be explained further with reference to FIG. 7 and FIG. 8. This shows a sample data structure for the profile manager 11 and a flow chart for the operation of the invention in this scenario.

FIG. 7 shows entries in the profile manager 11 for the agent, the customer and for users known as User 3 and User 4. The agent and customer have each specified three types of communication channel via which they may be reached: landline telephone, mobile telephone and Instant messaging. User 3 has simply specified that he may be contacted via landline telephone and user 4 has specified landline telephone and instant messaging as available channels. Clearly, the communication channel column shown in FIG. 7 will in actual fact specify not only the type of channel but also the telephone number or instant messaging address for the associated user as required.

There is also shown a priority column which indicates the priority or order of preference which each user has assigned to each of their chosen communication channels. For example, the agent has specified that his highest priority (i.e. level 1) communication channel is his landline telephone, and his lowest priority channel is instant messaging (i.e. level 3).

In addition, there is an Inhibit column which allows a user to inhibit the use of a specified communication channel for a particular user. For example, the agent has inhibited use of the landline telephone for establishing communication with user 3, and the customer has specified that the agent may not establish communication using his mobile telephone.

In FIG. 8, the customer sends an e-mail to the agent at a time when the agent is not able to receive his e-mail. The e-mail contains an embedded command for establishing a communications link between the customer and agent. In step 100, IRP 10 intercepts the e-mail, either as a matter of routine or because it has been configured especially to do so due to the fact that the agent is unable to receive e-mail at this time. The IRP 10 parses the e-mail and determines that the customer wishes to contact the agent and then retrieves, in step 101, their profiles from the profile manager.

In step 102 the IRP 10 subjects the retrieved profiles to a policy filter and to a preference filter. The policy filter identifies the communications channels that the agent and customer have in common, in this case telephone (landline and mobile) and instant messaging. The preference filter then decides on the basis of the priority and inhibit data which compatible pairs of channels to try and in what order.

Thus, in step 103 an attempt is made to establish a communications link between the customer and agent. The agent's highest priority channel is his landline telephone and the customer's is his mobile telephone. However, the use of the customer's mobile telephone for contact with the agent is inhibited, and so the IRP 10 first tries to establish communications between the agent's and the customer's landline telephone, this being the highest priority pair of uninhibited common communication channels. If the agent is not available on his landline then his mobile telephone will be tried instead in an attempt to establish communication between the customer's landline and the agent's mobile. If both of these attempts fail, then the lowest priority common communication channels, i.e. instant messaging, are tried. If this fails, communication is not established.

It can be seen from this example that by common communication channels we mean two channels (one for the source and one for the target) that are compatible with each other. Thus, the source's landline telephone system may be chosen as a common communication channel or system with the target's landline telephone or mobile telephone. Similarly, mobile telephone is a common communication system with landline telephone or another mobile telephone. However, a system such as instant messaging is incompatible with any voice telephone system and so is only considered a common communication channel with other instant messaging channels.

In establishing telephone communications the IRP 10 is configured to use voice-over-IP, as already described. Techniques for enabling this will be apparent to those skilled in the art, but exemplary methods include use of the Dialogic D41 ESC or the H323 protocol. Effectively, the IRP 10 establishes a telephone call with each of the source and target (e.g. the customer and agent) and then joins the two calls together, if successfully established, in the same manner as a conference call.

This invention also allows for the user profiles to be easily and dynamically modified as explained above. Thus, users can change the channels via which they may be contacted as necessary depending on the availability of those channels from time to time.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

We claim:

1. A computer-implemented method for establishing a communications link between a source and a target, the method comprising:

storing a source communication profile that identifies one or more first communication channels that were specified by the source and through which the source may communicate;

storing a target communication profile that identifies one or more second communication channels that were specified by the target and through which the target may communicate;

after storing the source communication profile and the target communication profile, receiving, at a server, an email that includes (1) source data that is associated with the source and (2) target data that is associated with the target;

in response to receiving the email:
retrieving the source communication profile,
retrieving the target communication profile,
comparing the one or more first communication channels of the source communication profile to the one or more second communication channels of the target communication profile to identify one or more possible communication links between the source and the target, wherein (a) at least one of the one or more first communication channels is of a different type than any of the one or more second communication channels or (b) at least one of the one or more second communication channels is of a different type than any of the one or more first communication channels, and opening a particular communications link, of the one or more possible communication links, between the source and the target.

2. A method according to claim 1, wherein the source communication profile identifies one or more of the following communication channels: instant messaging, mobile telephony, or landline telephony.

3. A method according to claim 1, wherein the source and target communication profiles are stored as a data structure on a database.

4. The method of claim 1, wherein:
the email contains a command that indicates that a communications link should be established;
the method further comprising, in response to receiving the email and prior to retrieving the source communication profile and the target communication profile, determining whether the email includes the command;
retrieving, comparing, and opening are also performed in response to determining that the email includes the command.

5. The method of claim 1, further comprising:
in response to receiving the email, determining whether the target is unable to receive emails;
wherein retrieving, comparing, and opening are also performed in response to determining that the target is unable to receive emails.

6. The method of claim 1, wherein:
the one or more second communication channels are a plurality of second communication channels;
the method further comprising, in response to receiving the email, determining that a particular communication channel of the plurality of second communication channels is associated with preference data;
identifying the one or more possible communication links is performed based on the preference data.

7. The method of claim 1, wherein:
the one or more second communication channels are a plurality of second communication channels;
the method further comprising, in response to receiving the email, determining that a particular communication channel of the plurality of second communication channels is associated with inhibit data that is specified by the target and that indicates that the particular communication channel should not be used in communicating with the source;
identifying the one or more possible communication links is performed based on the inhibit data.

8. A server adapted to receive data identifying a source and a target, wherein the server comprises a processor, said pserver adapted to cause said processor to:
store a source communication profile that identifies one or more first communication channels that were specified by the source and through which the source may communicate;
store a target communication profile that identifies one or more second communication channels that were specified by the target and through which the target may communicate;
receive an email that includes (1) source data that is associated with the source and (2) target data that is associated with the target;
in response to receiving the email:
retrieve the source communication profile,
retrieve the target communication profile,
compare the one or more first communication channels of the source communication profile to the one or more second communication channels of the target communication profile to identify one or more possible communication links between the source and the target, wherein (a) at least one of the one or more first communication channels is of a different type than any of the one or more second communication channels or (b) at least one of the one or more second communication channels is of a different type than any of the one or more first communication channels, and
open a particular communications link, of the one or more possible communication links, between the source and the target.

9. A server according to claim 8, wherein the source communication profile identifies one or more of the following communication channels: instant messaging, landline telephony, or mobile telephony.

10. A server according to claim 8, wherein the source and target communication profiles are stored as a data structure on a database.

11. The server of claim 8, wherein:
the email contains a command that indicates that a communications link should be established;
the server is further configured to cause the processor to determine whether the email includes the command in response to receiving the email and prior to retrieving the source profile and the target profile;
retrieving, comparing, and opening are also performed in response to determining that the email includes the command.

12. The server of claim 8, wherein the processor is further configured to:
determined whether the target is unable to receive emails in response to receiving the email;
wherein retrieving, comparing, and opening are also performed in response to determining that the target is unable to receive emails.

13. The server of claim 8, wherein:

the one or more second communication channels are a plurality of second communication channels;

the server is further configured to cause the processor to determine that a particular communication channel of the plurality of second communications channel is associated with preference data in response to receiving the email;

identifying the one or more possible communication links is performed based on the preference data.

14. The server of claim 8, wherein:

the one or more second communication channels are a plurality of second communication channels;

the server is further configured to cause the processor to, in response to receiving the email, determine that a particular communication channel of the plurality of second communication channels is associated with inhibit data that indicates that the particular communication channel should not be used in communicating with the source;

identifying the one or more possible communication links is performed based on the inhibit data.

15. A computer program product comprising program code stored on a non-transitory computer readable medium for establishing a communications link between a source and a target, said program is executed by a computer, causing:

storing a source communication profile that identifies one or more first communication channels that were specified by the source and through which the source may communicate;

storing a target communication profile that identifies one or more second communication channels that were specified by the target and through which the target may communicate;

receiving, at a server, an email that includes (1) source data that is associated with the source and (2) target data that is associated with the target;

in response to receiving the email:

retrieving the source communication profile, retrieving the target communication profile, comparing the one or more first communication channels of the source communication profile to the one or more second communication channels of the target communication profile to identify one or more possible communication links between the source and the target, wherein (a) at least one of the one or more first communication channels is of a different type than any of the one or more second communication channels or (b) at least one of the one or more second communication channels is of a different type than any of the one or more first communication channels, and opening a particular communications link, of the one or more possible communication links, between the source and the target.

16. The computer program product of claim 15, wherein:

the email contains a command that indicates that a communications link should be established;

said program code further comprising program code for causing, in response to receiving the email and prior to retrieving the source communication profile and the target communication profile, determining whether the email includes the command;

retrieving, comparing, and opening are also performed in response to determining that the email includes the command.

17. The computer program product of claim 15, further comprising:

in response to receiving the email, determining whether the target is unable to receive emails;

wherein retrieving, comparing, and opening are also performed in response to determining that the target is unable to receive emails.

18. The computer program product of claim 15, wherein:

the one or more second communication channels are a plurality of second communication channels;

said program code further comprising program code for causing, in response to receiving the email, determining that a particular communication channel of the plurality of second communication channels is associated with preference data;

identifying the one or more possible communication links is performed based on the preference data.

19. The computer program product of claim 15, wherein:

the one or more second communication channels are a plurality of second communication channels;

said program code further comprising program code for causing, in response to receiving the email, determining that a particular communication channel of the plurality of second communication channels is associated with inhibit data that indicates that the particular communication channel should not be used in communicating with the source;

identifying the one or more possible communication links is performed based on the inhibit data.

* * * * *